(12) United States Patent
Brauer et al.

(10) Patent No.: US 6,983,968 B2
(45) Date of Patent: Jan. 10, 2006

(54) HEADACHE RACK FOR PICKUP TRUCKS

(75) Inventors: Blackford Brauer, Crystal Lake, IL (US); Atul Saigal, Algonquin, IL (US); Tony O'Dierno, Walworth, WI (US); Wes McReynolds, McHenry, IL (US)

(73) Assignee: Knaack Manufacturing Company, Crystal Lake, IL (US)

( * ) Notice: Subject to any disclaimer, the term of this patent is extended or adjusted under 35 U.S.C. 154(b) by 5 days.

(21) Appl. No.: 10/700,165

(22) Filed: Nov. 3, 2003

(65) Prior Publication Data

US 2005/0093320 A1    May 5, 2005

(51) Int. Cl.
    *B60P 3/00*    (2006.01)

(52) U.S. Cl. .............................. 296/3; 296/7; 280/756; 224/405; 224/500; 224/551

(58) Field of Classification Search .................... 296/3, 296/7, 26.04, 26.05; 280/756; 224/403, 224/405, 501, 551, 552, 500
See application file for complete search history.

(56) References Cited

U.S. PATENT DOCUMENTS

| | | | |
|---|---|---|---|
| 2,720,414 A * | 10/1955 | Hart ............................ | 296/12 |
| D206,654 S | 1/1967 | Smith ........................... | D14/6 |
| 3,664,704 A | 5/1972 | Ellis ............................. | 296/24 |
| 4,405,170 A | 9/1983 | Raya ............................ | 296/10 |
| 4,611,824 A | 9/1986 | McIntosh ..................... | 280/748 |
| 4,692,845 A | 9/1987 | Widhalm et al. ............. | 362/80 |
| 4,722,030 A * | 1/1988 | Bowden ....................... | 362/493 |
| 4,867,497 A | 9/1989 | Jayne ........................... | 296/3 |
| D306,003 S | 2/1990 | Berkan, Jr. .................. | D12/155 |
| 4,953,908 A | 9/1990 | Dondlinger ................. | 296/97.4 |
| 4,973,099 A | 11/1990 | Deaver et al. | |
| 4,974,125 A * | 11/1990 | McGehee ..................... | 362/505 |
| 5,035,458 A | 7/1991 | Boensch ...................... | 296/1.1 |
| 5,037,152 A * | 8/1991 | Hendricks ..................... | 296/3 |
| 5,165,707 A * | 11/1992 | Morimanno et al. ........ | 280/756 |
| 5,195,813 A * | 3/1993 | Brown ......................... | 362/464 |
| D337,556 S | 7/1993 | Gros ........................... | D12/167 |
| 5,258,893 A * | 11/1993 | Finneyfrock ................ | 362/485 |
| 5,431,472 A * | 7/1995 | Coffland ........................ | 296/3 |
| 5,439,152 A * | 8/1995 | Campbell .................... | 224/405 |
| 5,476,301 A * | 12/1995 | Berkich ......................... | 296/3 |
| 5,480,205 A | 1/1996 | Tayar ............................ | 296/3 |
| 5,560,666 A | 10/1996 | Vieira et al. .................. | 296/3 |
| 5,628,540 A | 5/1997 | James ........................... | 296/3 |
| D381,306 S | 7/1997 | Sauerwein .................. | D12/190 |
| D388,385 S | 12/1997 | Protz, Sr. .................... | D12/167 |
| D392,938 S | 3/1998 | Sylvester .................... | D12/426 |
| D467,862 S | 12/2002 | Jenkins ....................... | D12/414 |
| 6,557,917 B1 | 5/2003 | Colcombe ..................... | 296/3 |
| 6,676,278 B2 * | 1/2004 | Striebel et al. ............. | 362/267 |
| 6,698,810 B1 * | 3/2004 | Lane ............................ | 296/3 |
| 6,711,275 B2 * | 3/2004 | Damerow et al. .......... | 381/389 |
| 2001/0050489 A1 | 12/2001 | Felix | |
| 2003/0011180 A1 | 1/2003 | Coffman et al. ............ | 280/748 |

\* cited by examiner

*Primary Examiner*—Patricia L. Engle
(74) *Attorney, Agent, or Firm*—McDonnell Boehnen Hulbert & Berghoff LLP

(57) ABSTRACT

The headache rack for pickup trucks that supports and secures loads being transported while protecting the rear window from damage and the passengers seated in the cab from harm. The headache rack is adjustable in height in order to accommodate pickup trucks having varying cab heights. Further, the headache rack is provided with internal wiring pathways to safely run wiring from any lights mounted on the uppermost surface of the rack to the pickup truck's electrical system.

13 Claims, 3 Drawing Sheets

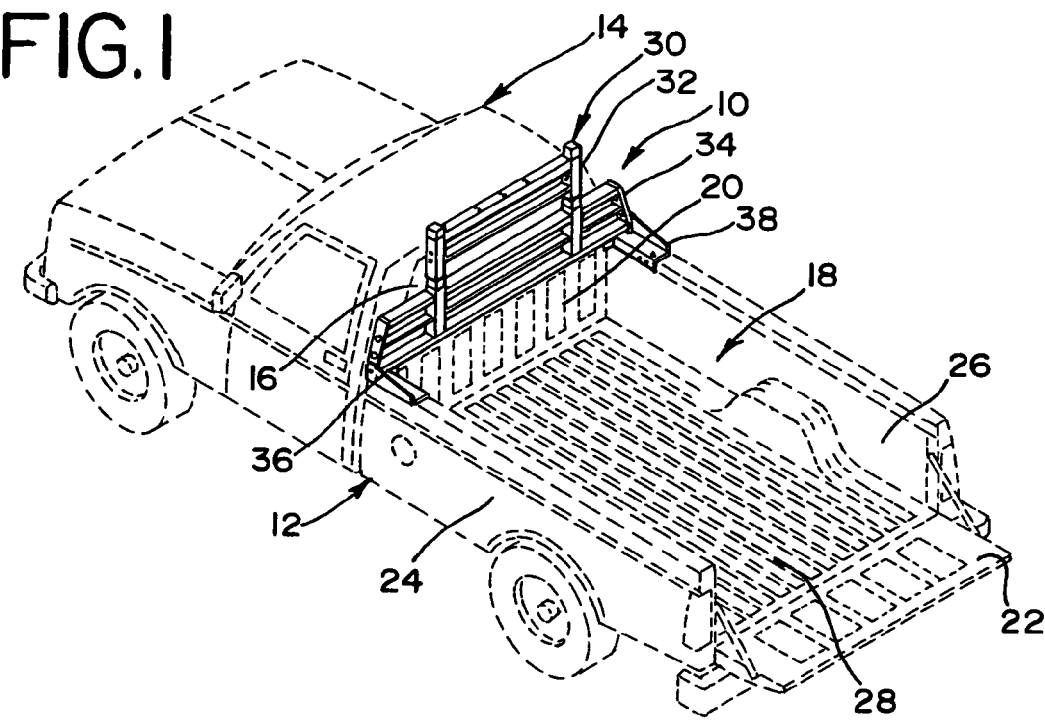
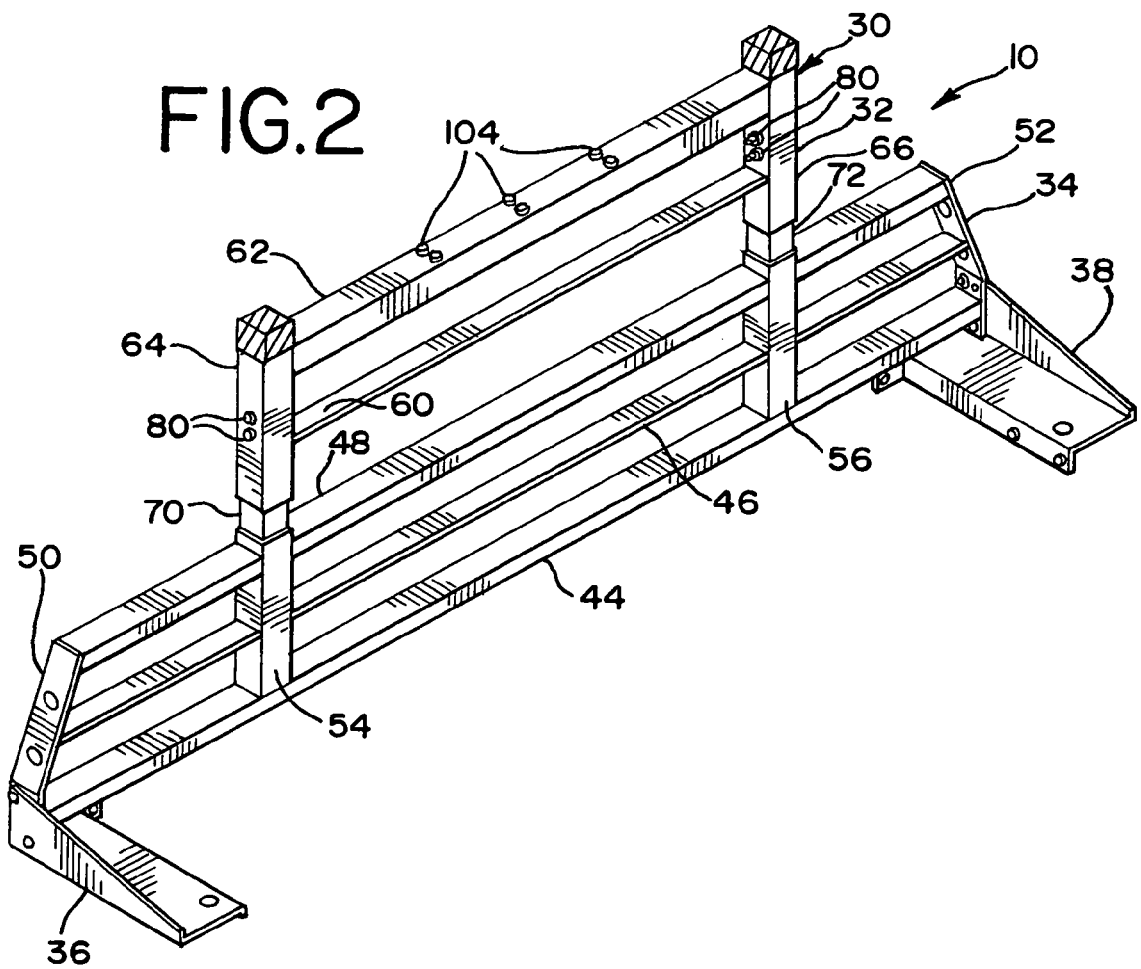

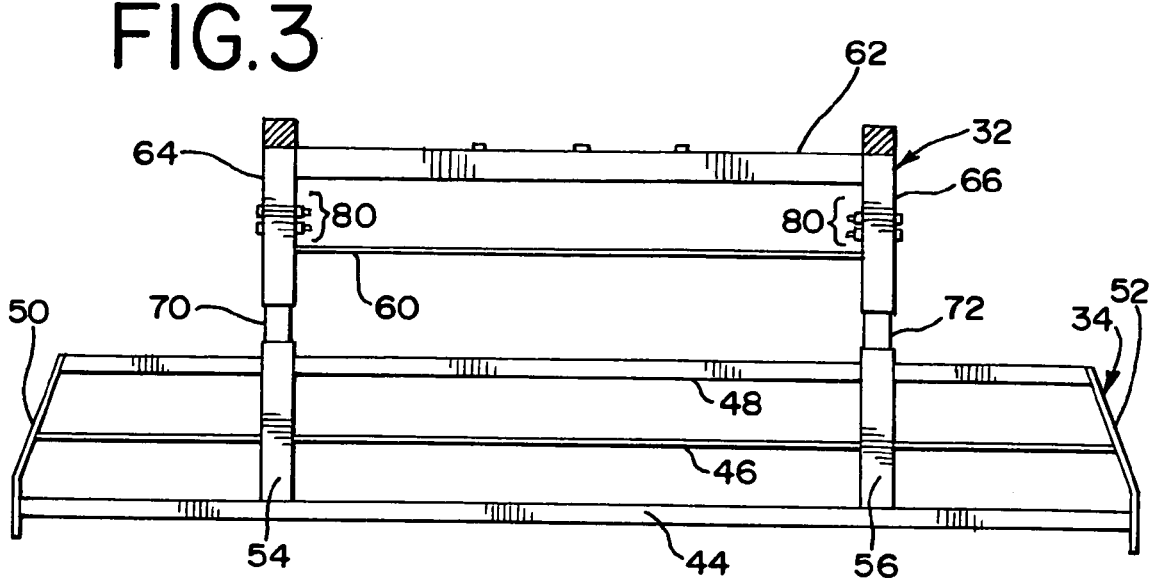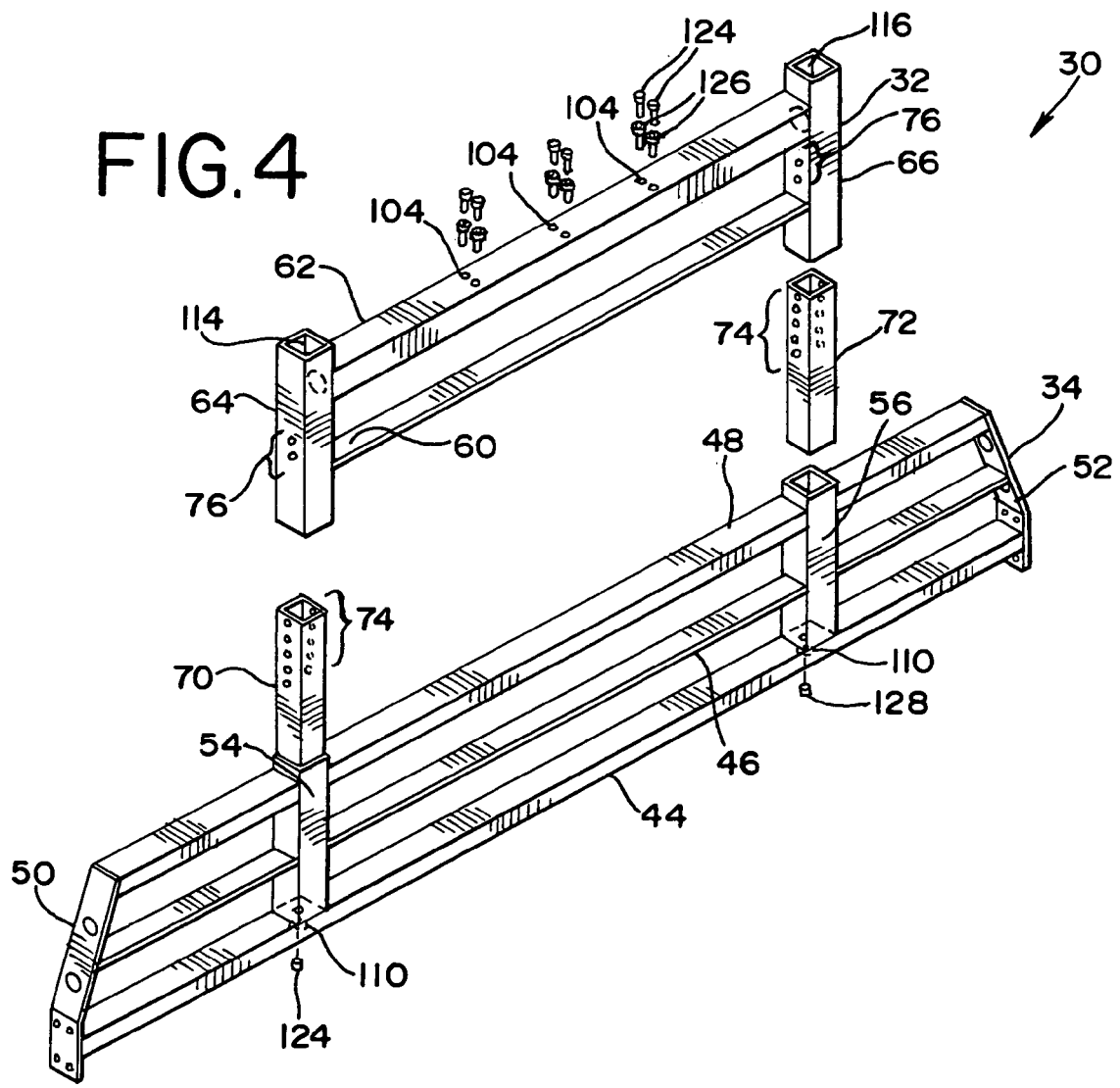

HEADACHE RACK FOR PICKUP TRUCKS

BACKGROUND OF THE INVENTION

1. Field of the Invention

This invention relates to the field of racks for vehicles. More particularly, this invention relates to a headache rack to be mounted behind the rear window of a pickup truck for use in supporting and securing loads being transported as well as protecting the driver and passenger from the load being carried in the pickup truck.

2. Description of Related Art

The prior art reveals a wide variety of racks for pickup trucks. These racks function to support loads being carried in the bed of the pickup truck as well as to protect the driver and any passengers from the load being carried. All of the known racks, however, suffer from common shortcomings.

Pickup trucks do not come in standard dimensions. For example, cabs of pickup trucks vary in height. As a result, manufacturers offer different model racks for trucks with different cab heights. None of the known racks is adjustable to accommodate pickup trucks having different cab heights.

In addition to being used for carrying and supporting loads, racks are also used for mounting lights. Lights are employed to supplement the illumination normally provided by the headlights and the back-up lights. Typically, the lights are mounted on the uppermost surface of the rack. Wires or conductors then extend downwardly from the lights, are secured along the external surfaces of the rack, and eventually are connected to the electrical system of the truck. Various methods such as cable ties, wire ties, and electrical tape typically have been used to attach the wiring to the rack. The resulting arrangement is not ideal in that the wiring is exposed to the elements and therefore is subject to the elements and possible failure. None of the known racks provides internal wire pathways for the electrical wire so as to protect it from the elements.

Accordingly, what is needed is a pickup truck headache rack that is adjustable to accommodate pickup trucks having different height cabs. There is a further need for a pickup truck headache rack that provides internal electrical pathways so as to protect any wiring from the elements.

SUMMARY OF THE INVENTION

The present invention meets the shortcomings of the prior art by providing a pickup truck headache rack that is adjustable in order to accommodate cabs having different heights. The frame sections telescope with respect to one another, thereby allowing the overall height of the rack to be adjusted. The benefit of such a telescoping feature is that the rack can be used with a number of different pickup trucks having varying cab heights.

The present invention further meets the shortcomings of the prior art by providing a pickup truck headache rack having electrical pathways through which wiring can be pulled. Thus, lights may be mounted along the top of the rack frame and the associated wiring can then be pulled through the pathways provided in the rack frame members. The electrical pathways protect the wiring from the elements.

BRIEF DESCRIPTION OF THE DRAWINGS

FIG. 1 is a perspective view of the headache rack of the present invention mounted on a pickup truck.

FIG. 2 is a detailed perspective view of the rack of FIG. 1.

FIG. 3 is a front view of the rack of FIG. 1, shown without the mounting bases.

FIG. 4 is a perspective exploded view of the rack of FIG. 3.

DETAILED DESCRIPTION OF THE PREFERRED EMBODIMENTS

Figure 5:
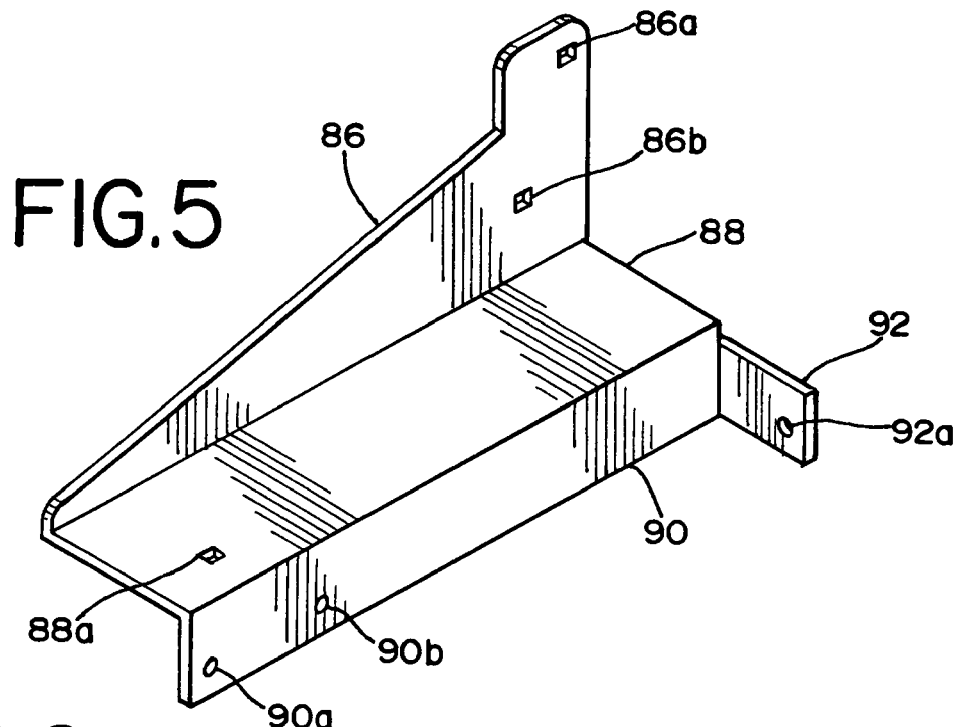
FIG. 5 is a perspective view of one of the mounting bases shown in FIG. 1.

With reference to FIG. 1, rack 10 is depicted mounted to a pickup truck 12 having a cab 14 with a rear window 16, and a cargo bed 18 having a front wall 20, a back wall 22, two sidewalls 24, 26, and a bottom wall 28. The rack 10 includes a frame 30 having an upper and a lower frame section 32, 34, and a pair of mounting bases 36, 38.

As best seen in FIG. 2, the lower frame section 34 comprises a lower rectangular tubular cross bar member 44, a first solid bar member 46, and an intermediate rectangular tubular cross bar member 48, all extending horizontally across the frame 30. The lower frame section 34 is further provided with an angled solid bar member 50, 52 at each end of the lower frame section and a pair of upstanding members 54, 56 extending vertically across the frame section and spaced inwardly from the end bar members. The tubular cross bar members 44, 48 and the solid bar member 46 may be welded to the end bar members 50, 52. Similarly, the upstanding members 54, 56 of the lower frame section 34 may be welded to the various sections of the horizontal members 44, 46, 48.

The upper frame section 32 of the rack comprises a second solid bar member 60 and an upper rectangular tubular cross bar member 62, both extending horizontally across the frame. The upper frame section 32 also includes a pair of upstanding members 64, 66 extending vertically across the frame, one upstanding member located at each end of the frame section. The upstanding members 64, 66 of the upper frame section 32 may be welded to the horizontal members 60, 62.

In order to adjust the height of the overall rack, the frame 30 further includes a pair of rectangular tubular members 70, 72 that are best seen in FIG. 4. The tubular members 70, 72 may be welded at one end to respective upstanding members 54, 56 of the lower frame section 34. The other end of each rectangular tubular member 70, 72 mates with a respective upstanding member 64, 66 of the upper frame section 32 in a telescoping manner, thereby enabling the upper frame section 32 to move with respect to the lower frame section 34. Both the tubular members 70, 72 and the upstanding members 64, 66 of the upper frame section 32 are shown provided with a series of adjusting holes 74, 76. Once the desired height is achieved, the holes of the tubular members 74 and the holes of the upstanding members 76 are aligned, and fasteners 80 are inserted through the holes 74, 76 to lock the rack in place. As shown in FIG. 3, two pairs of fasteners 80 are used for purposes of locking the rack. It should be understood that any arrangement of suitable fasteners could be used for this purpose. Further, the telescoping feature is not limited to the geometry of the members depicted in the Figures, but rather encompasses other suitable geometries as well. It is the telescoping feature that allows the overall height of the rack to be adjusted as needed.

The rack is provided with a pair of mounting bases 36, 38 for mounting the rack to the cargo bed sidewalls 24, 26 of a pickup truck 12. The features of the mounting bases 36, 38 are best seen in FIG. 5, in which one of the bases is depicted. It should be understood that the remaining base is the mirror image of that shown in FIG. 5. Each base 36, 38 includes a frame mounting bracket 86, a horizontal mounting surface 88, a vertical mounting surface 90, and a mounting flange 92. The holes depicted on the base accommodate suitable fasteners such as bolts. The frame mounting bracket 86 attaches to the lower frame section 34. The horizontal mounting surface 88 lies on the top of the side wall 24, 26 of the pickup truck cargo bed while the vertical mounting surface 90 abuts against the vertical lip of the cargo bed sidewall 24, 26. The flange 92 abuts against the front sidewall 20 of the cargo bed of the pickup truck. Alternate geometries and supports can be used for the rack mounting.

The rack of the present invention, including the frame sections and the mounting bases, may be constructed from steel or aluminum.

Figure 6:
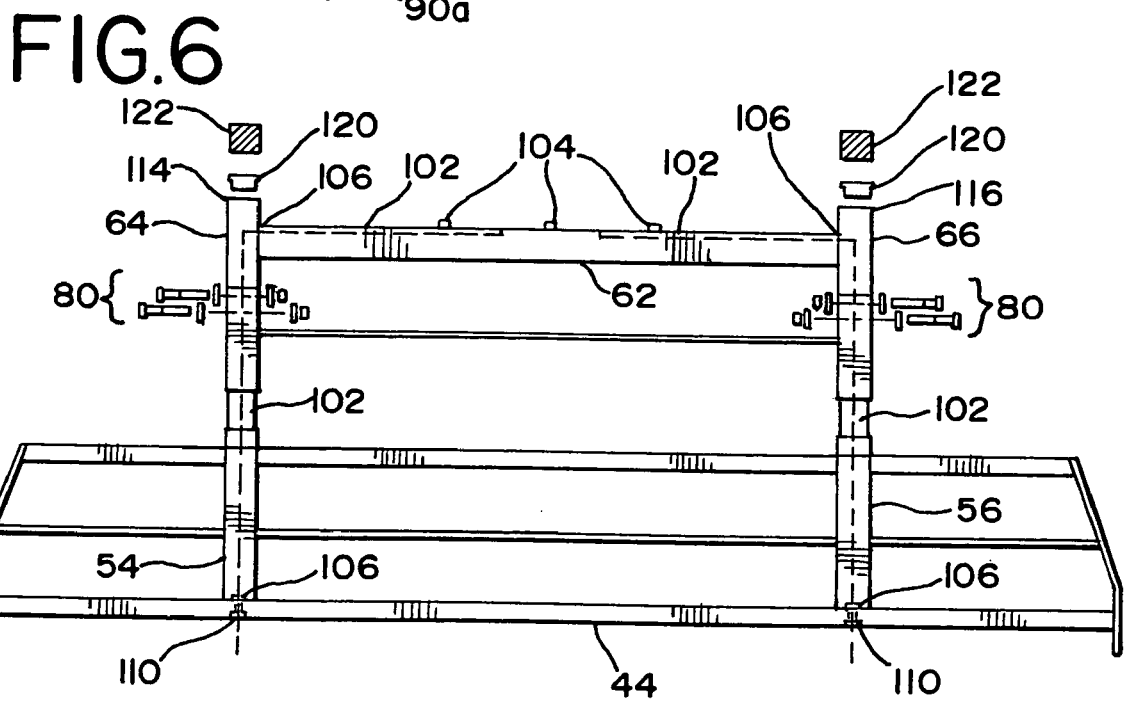
FIG. 6 is a front, partially cross-sectional view of the rack of FIG. 1, depicting the wire pathways.
Figure 7A:
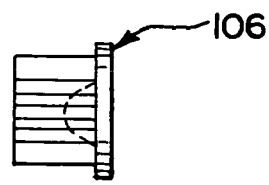
FIGS. 7A and 7B are cross-sectional and front views, respectively, of a snap bushing shown in FIG. 6.
Figure 7B:
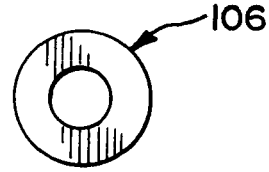

Referring to FIG. 6, the wire pathways provided in the rack are depicted with dashed lines 102. Wire can enter or exit the rack through one of the access holes 104 along the upper rectangular tubular cross bar member 62 of the upper frame section 32. The wire can then be run through either set of upstanding members 54, 56, 64, 66 towards the lower rectangular tubular cross bar member 44. A plurality of snap bushings 106 is installed internally along the pathway to protect the wiring. Access holes 110 are provided through the lower rectangular tubular cross bar member 44 through which wiring may enter or exit the rack. From the access holes 110, the wiring is then connected to the electrical system (not shown) of the truck.

To further protect the wiring from the elements, closures are provided for the openings 114, 116 at the upper ends of the upstanding members 64, 66 of the upper frame section 32. After the wiring has been run, a plug 120 is inserted into each opening 114, 116 and a cap 122 is slid down over the upper end of each upstanding member 64, 66.

In addition, as seen in FIG. 4, bolts 124 with blind fasteners 126 may be used to seal the access holes 104 that are not used. Similarly, plugs 128 may provided for the access holes 110. In order to allow wire entry/exit, a hole may be drilled in the center of each plug 128.

To install the rack 10, the upper frame section 32 is mounted onto the lower frame section 34 via the tubular members 70, 72. The end members 50, 52 of the frame are then bolted to the mounting brackets 86 of the mounting bases 36, 38, which are in turn bolted to the cargo bed 18. On both the driver's side and the passenger side, one bolt fastens the horizontal mounting surface 88 to the top of the sidewall 24, 26 of the cargo bed 18, two bolts through the vertical mounting surface 90 into the vertical lip of the cargo bed sidewall 24, 26, and one bolt through the flange 92 into the front sidewall 20 of the cargo bed 18. As depicted in FIG. 1, the rack is positioned in the forward end of the cargo bed 18 of a pickup truck 12, with the frame 30 adjacent to the rear window 16 of the cab 14 of the truck 12. The height of the rack 10 is then adjusted to accommodate the particular pickup truck cab 14. If lights are mounted on the upper rectangular tubular cross bar member 62, then the wiring can be run internally as previously described above.

In addition to supporting and securing loads being transported in pickup trucks, the rack protects the rear window from damage while at the same time protecting the passengers seated in the cab from harm. One advantage of the rack of the present invention is that it can be used with pickup trucks having different cab heights. A further advantage of the rack is that it provides wiring pathways to safely run wiring from any lights mounted on the uppermost member of the rack through the rack to the pickup truck's electrical system.

While certain features and embodiments of the present invention have been described in detail herein, it is to be understood that the invention encompasses all modifications and enhancements within the scope and spirit of the following claims.

What is claimed is:

1. A headache rack for a pickup truck comprising:
   a rack frame including an upper frame section;
   a lower frame section including at least two bar members extending horizontally across the lower frame section and a pair of upstanding members positioned inwardly from the ends of the bar members; and
   a pair of tubular members attached to the upstanding members of the lower frame section,
   the upper frame section mating with the tubular members in a telescoping manner in order to adjust the height of the rack to accommodate pickup trucks of different heights; and
   a rack mounting provided on the frame for mounting the frame to a pickup truck.

2. The headache rack of claim 1 wherein the upper frame section includes a pair of upstanding members, the upstanding members of the upper frame section mating with the tubular members in a telescoping manner in order to adjust the height of the rack.

3. The headache rack of claim 2 wherein a plurality of pairs of holes are provided on the tubular members and a plurality of holes are provided on the upstanding members of the upper frame section.

4. The headache rack of claim 3 further comprising fasteners, each fastener mating with one of the pairs of holes on a respective tubular member and with one of the holes on a respective upstanding member of the upper frame section in order to lock the rack in the desired height.

5. A headache rack for a pickup truck comprising:
   a rack frame including a lower frame section, a pair of tubular members mounted to the lower frame section, and an upper frame section mating with the tubular members,
   the lower frame section includes a lower tubular member extending horizontally across the section and a pair of upstanding members positioned inwardly from the ends of the lower tubular member,
   the frame including internal wiring pathways for running wiring from any electrical devices mounted on the rack to a power source in order to protect the wiring from the elements, the wiring pathways provided through the upper frame section, the tubular members, and the upstanding members and the lower tubular member of the lower frame section; and
   a rack mounting provided on the frame for mounting the frame to a pickup truck.

6. The headache rack of claim 5 further including at least one access hole through which the wiring may enter the rack.

7. The headache rack of claim 5 further including at least one access hole through which the wiring may exit the rack.

8. The headache rack of claim 5 further includes a plurality of snap bushings installed internally to protect the wiring.

9. The headache rack of claim 5 wherein the upper frame section includes an upper tubular member and a pair of upstanding members, the wiring pathways provided through the upper tubular member and upstanding members of the upper frame section, the tubular members, and the lower frame section.

10. The headache rack of claim 9 wherein each upstanding member of the upper frame section has an upper end, each upper end provided with a closure to further protect any wiring from the elements.

11. The headache rack of claim 5 wherein the upper frame section includes an upper tubular member having at least one access hole through which the wiring may enter the rack.

12. The headache rack of claim 5 wherein the lower tubular member of the lower frame section having at least one access hole through which the wiring may exit the rack.

13. A headache rack for a pickup truck comprising:
   a rack frame including an upper frame section and a lower frame section,
   the lower frame section including at least two bar members extending horizontally across the lower frame section and a pair of upstanding members positioned inwardly from the ends of the bar members,
   a pair of tubular members attached to the upstanding members of the lower frame section,
   the upper frame section mating with the tubular members in a telescoping manner in order to adjust the height of the rack to accommodate pickup trucks of different heights;
   internal wiring pathways for running wiring from any electrical devices mounted on the rack to a power source in order to protect the wiring from the elements, the wiring pathways provided through the upper frame section, the tubular members, and the lower frame section; and
   a rack mounting provided on the frame for mounting the frame to a pickup truck.

* * * * *